United States Patent
Salter et al.

(10) Patent No.: US 10,399,486 B2
(45) Date of Patent: Sep. 3, 2019

(54) VEHICLE DOOR REMOVAL AND STORAGE

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 15/591,172

(22) Filed: May 10, 2017

(65) Prior Publication Data
US 2018/0326897 A1    Nov. 15, 2018

(51) Int. Cl.
| | |
|---|---|
| *B60R 5/04* | (2006.01) |
| *B60Q 3/217* | (2017.01) |
| *B60Q 3/30* | (2017.01) |
| *B60Q 3/80* | (2017.01) |
| *B60Q 3/76* | (2017.01) |

(52) U.S. Cl.
CPC ............. *B60Q 3/217* (2017.02); *B60Q 3/30* (2017.02); *B60Q 3/76* (2017.02); *B60Q 3/80* (2017.02); *B60R 5/04* (2013.01)

(58) Field of Classification Search
CPC ............ B60Q 3/217; B60Q 3/51; B60Q 3/80; B60Q 3/30; B60Q 3/60; B60R 5/04
USPC ......... 296/37.1, 37.8, 37.16, 146.11; 49/463, 49/465
See application file for complete search history.

(56) References Cited

U.S. PATENT DOCUMENTS

| | | | |
|---|---|---|---|
| 2,486,859 A | 11/1949 | Meijer et al. | |
| 3,452,190 A | 6/1969 | Senseman | |
| 4,270,790 A * | 6/1981 | Curotto | B60N 2/3013 296/37.16 |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,036,336 A | 3/2000 | Wu | |
| 6,117,362 A | 9/2000 | Yen et al. | |
| 6,294,990 B1 | 9/2001 | Knoll et al. | |
| 6,419,854 B1 | 7/2002 | Yocom et al. | |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

Brent Minderler, How to Take the Doors Off Your Jeep, May 31, 2006, 6 pages.

*Primary Examiner* — Joseph D. Pape
(74) *Attorney, Agent, or Firm* — Vichit Chea; Price Heneveld LLP

(57) ABSTRACT

A vehicle includes a hinge assembly rotatably coupling a vehicle door to a frame of the vehicle. A first light assembly is positioned proximate the door and configured to illuminate the hinge assembly. A door retention system having a housing defining a slot is configured to accept the insertion of the vehicle door. A second light assembly is configured to illuminate the slot.

18 Claims, 10 Drawing Sheets

(56) References Cited

U.S. PATENT DOCUMENTS

| | | |
|---|---|---|
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,735,822 B2 * | 5/2004 | Spurr .................... B60J 5/0431 |
| | | 16/319 |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,860,542 B1 | 3/2005 | Zabtcioglu |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,607,807 B2 * | 10/2009 | Hall ........................ B60Q 3/51 |
| | | 296/215 |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,182,011 B2 * | 5/2012 | Suzuki .................... B60R 5/041 |
| | | 296/26.09 |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,596,317 B1 * | 12/2013 | McNulty ................ B60N 3/046 |
| | | 150/154 |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,162,555 B2 | 10/2015 | Kodama |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0283288 A1 * | 11/2010 | Toyozumi ........... B60R 16/0215 |
| | | 296/146.9 |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |
| 2018/0113480 A1 * | 4/2018 | Lota ........................ B60R 5/04 |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |

(56) References Cited

FOREIGN PATENT DOCUMENTS

| | | | |
|---|---|---|---|
| DE | 29708699 U1 | 7/1997 | |
| DE | 10319396 A1 | 11/2004 | |
| DE | 102008011340 A1 * | 9/2009 | ............. B60Q 3/217 |
| DE | 102009020333 A1 * | 11/2010 | ............. B60Q 3/217 |
| EP | 1793261 A1 | 6/2007 | |
| EP | 2778209 A1 | 9/2014 | |
| JP | 2000159011 A | 6/2000 | |
| JP | 2002240626 | 8/2002 | |
| JP | 2004256043 | 9/2004 | |
| JP | 2007238063 A | 9/2007 | |
| KR | 20060026531 A | 3/2006 | |
| WO | 2006047306 A1 | 5/2006 | |
| WO | 2014068440 A1 | 5/2014 | |
| WO | 2014161927 A1 | 10/2014 | |

\* cited by examiner

VEHICLE DOOR REMOVAL AND STORAGE

FIELD OF THE INVENTION

The present disclosure generally relates to vehicles, and more particularly, to the removal and storage of doors of the vehicle.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle includes a hinge assembly rotatably coupling a vehicle door to a frame of the vehicle. A first light assembly is positioned proximate the door and configured to illuminate the hinge assembly. A door retention system having a housing defining a slot is configured to accept the insertion of the vehicle door. A second light assembly is configured to illuminate the slot.

According to another aspect of the present disclosure, a vehicle includes a hinge assembly rotatably coupling a vehicle door to a frame of the vehicle. A first photoluminescent structure is positioned on the hinge assembly. A door retention system having a housing defining a slot is configured to accept the insertion of the vehicle door. A light assembly is configured to illuminate the slot.

According to yet another aspect of the present disclosure, a method of removing and storing a door of a vehicle, including the steps: activating a first light assembly to illuminate a hinge assembly coupling the door to the vehicle, disassembling the hinge assembly, activating a second light assembly to illuminate a slot of a door retention system and inserting the door into the slot.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
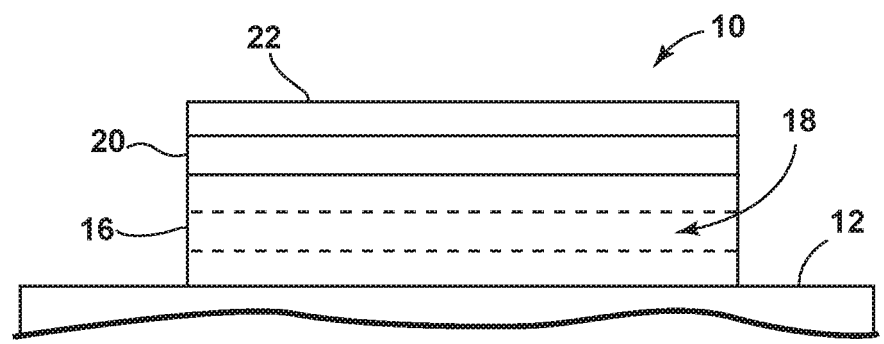
FIG. 1A is a side view of a photoluminescent structure rendered as a coating for use in an assembly according to one embodiment.
Figure 1B:
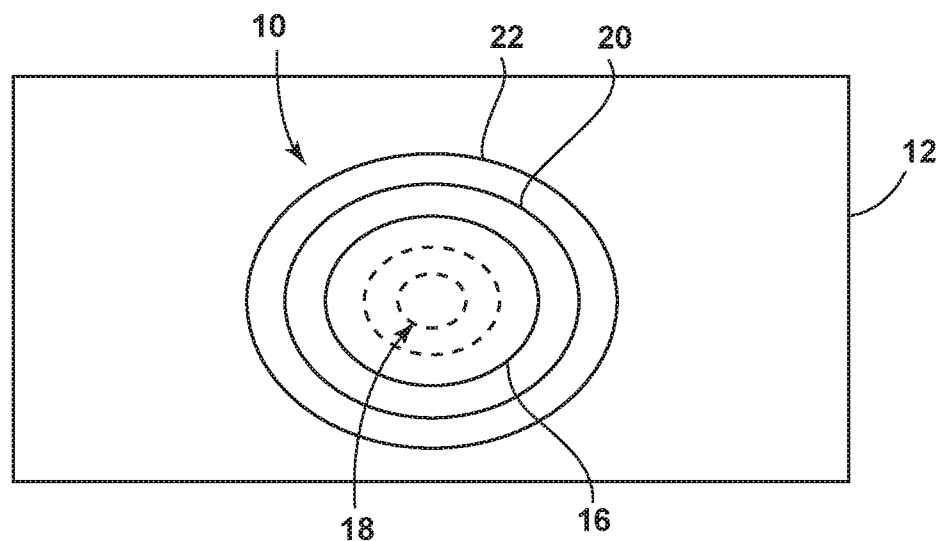
FIG. 1B is a top view of a photoluminescent structure rendered as a discrete particle according to one embodiment.
Figure 1C:
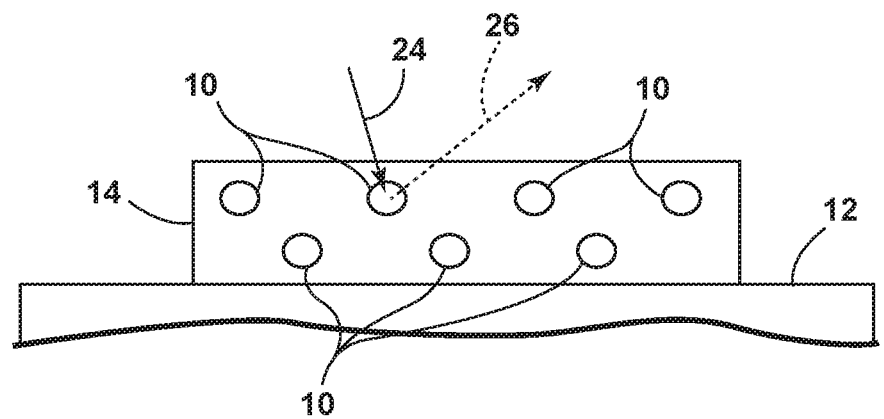
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. According to various examples, the photoluminescent structure may be referred to herein as a luminescent structure. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 $mcd/m^2$ after a period of 10 minutes. Additionally, the long persistence photoluminescent material 18 may be operable to emit light above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 $mcd/m^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-11, a vehicle 40 includes a hinge assembly 44 rotatably coupling a vehicle door 48 to a frame 52 of the vehicle 40. A first light assembly 56 is positioned proximate the door 48 and configured to illuminate the hinge assembly 44. A door retention system 60 includes a housing 64 defining a slot 68 configured to accept the insertion of the vehicle door 48. A second light assembly 72 is configured to illuminate the slot 68.

Figure 2:
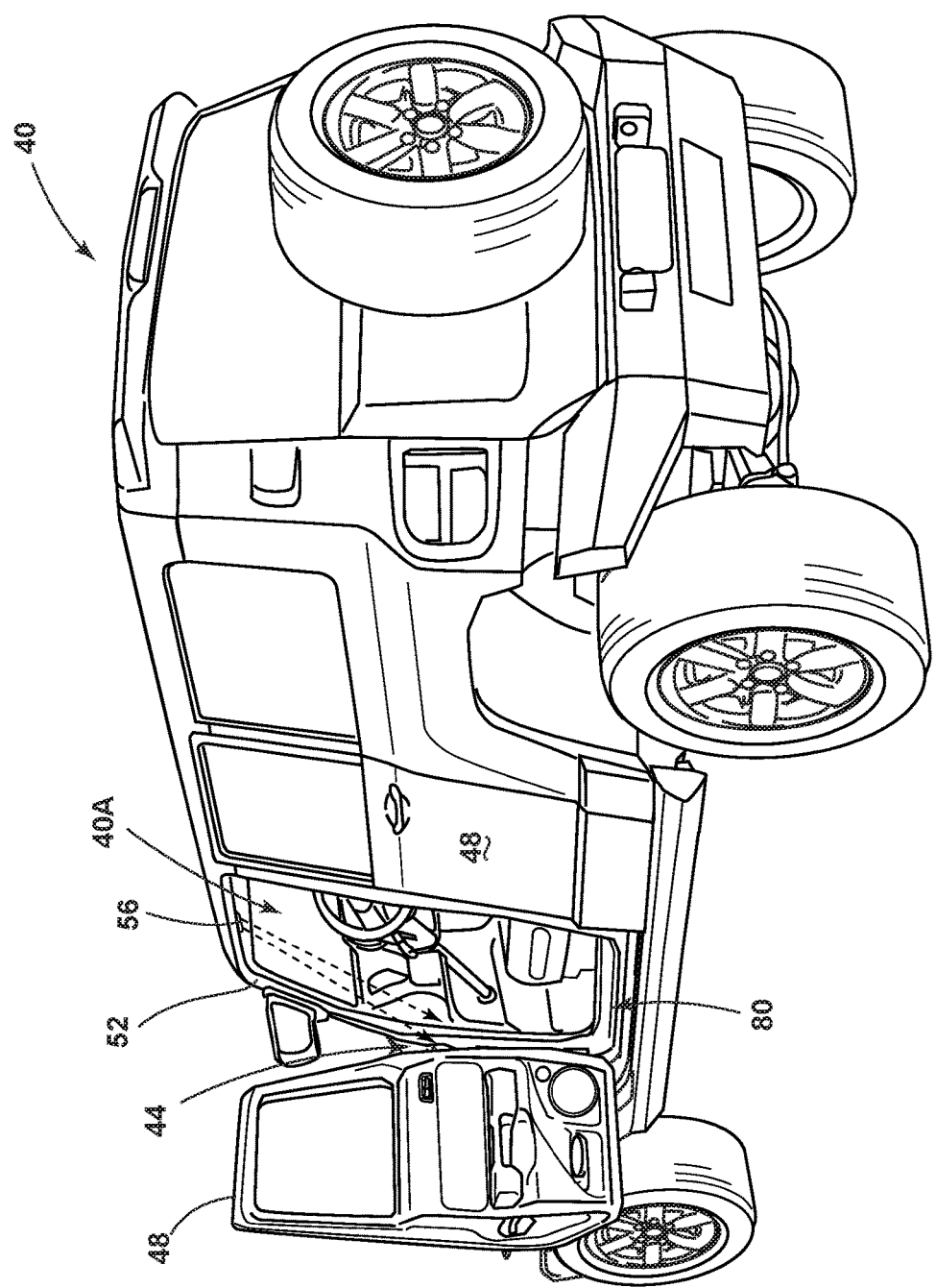
FIG. 2 is a rear perspective view of a vehicle, according to at least one example.
Figure 6:
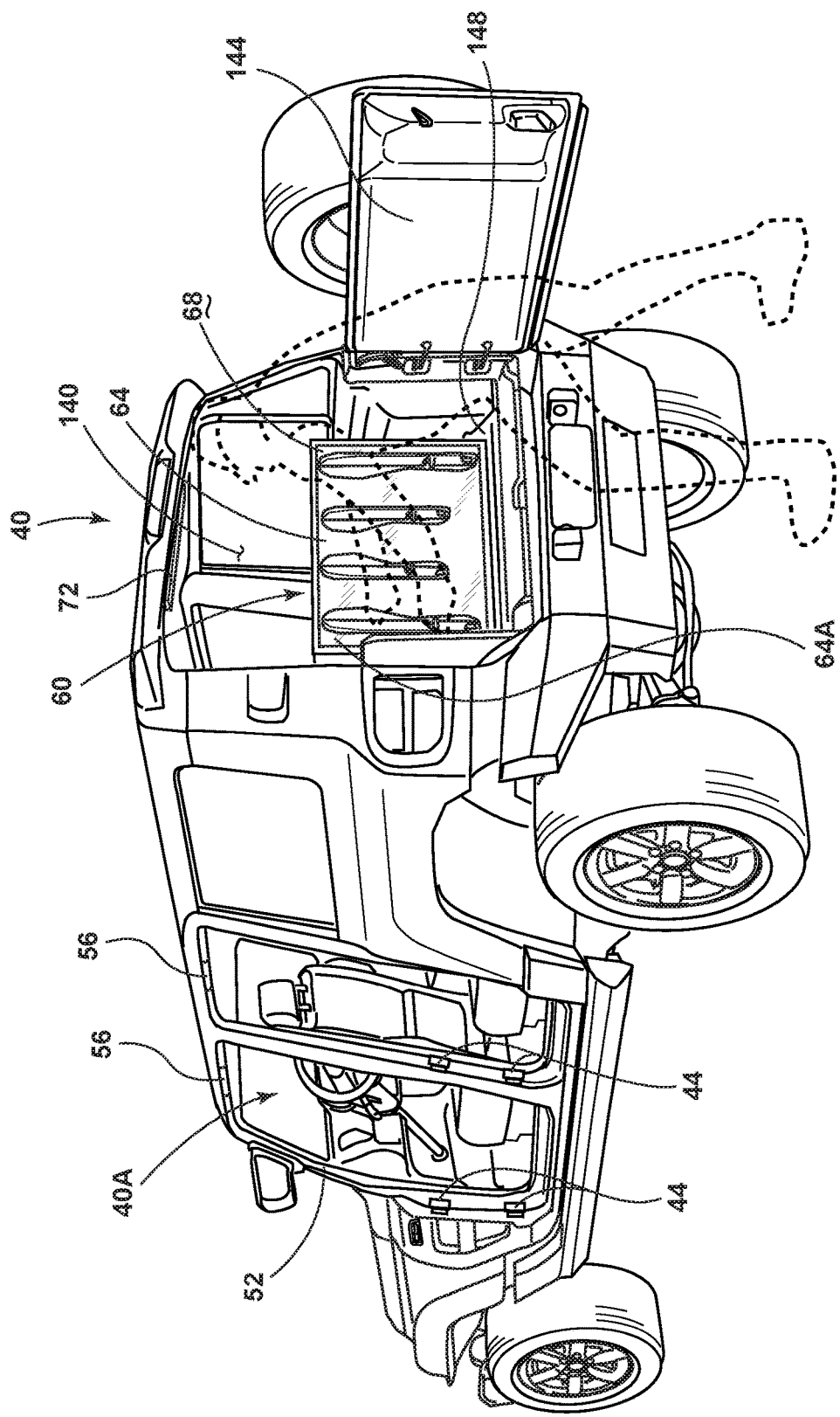
FIG. 6 is a rear perspective view of the vehicle, according to at least one example.

Referring now to FIG. 2, the vehicle 40 is capable of operation in a "doors on" (FIG. 2) configuration and a "doors off" configuration (FIG. 6). In the doors on configuration, the vehicle 40 includes a plurality of doors 48 (e.g., driver and passenger doors) positioned around the vehicle 40 enclosing an interior 40A, or passenger cabin, of the vehicle 40. The doors 48 are operable between a closed position and an open position. In essence, the vehicle 40 may be operated in a doors on configuration with the doors 48 attached to a frame of the vehicle 40 through the hinge assembly 44. In the doors off configuration, one or more of the doors 48 may be removed prior to operation (e.g., driving) of the vehicle 40 such that increased ventilation and/or a desired aesthetic appeal of the vehicle 40 is achieved.

Figure 3B:
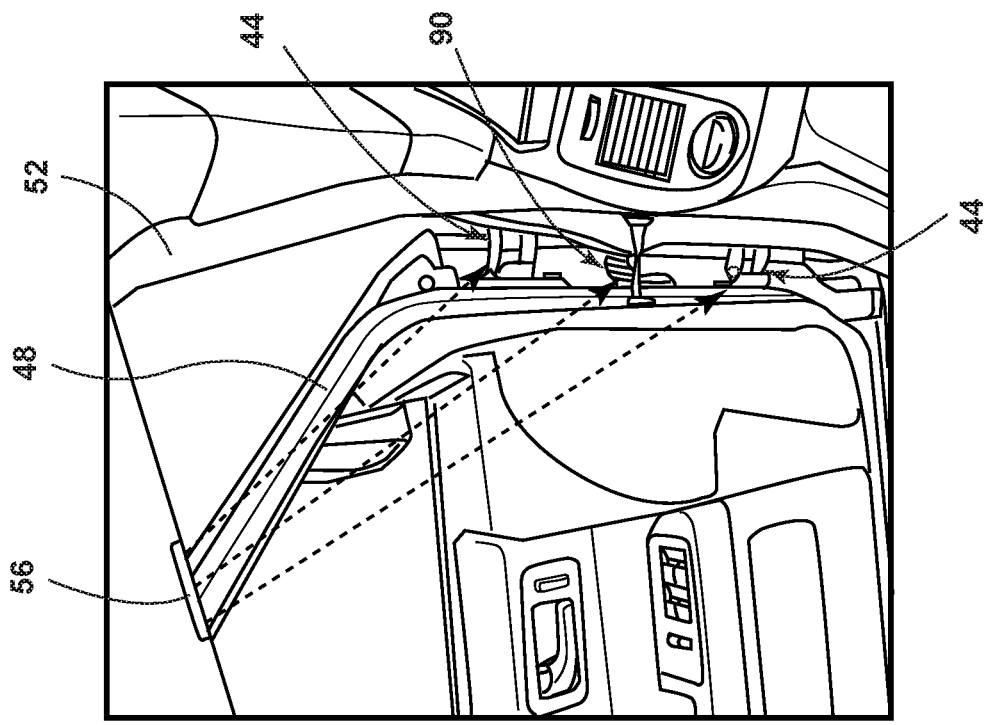
FIG. 3B is an interior perspective view of a vehicle, according to at least one example.
Figure 3A:
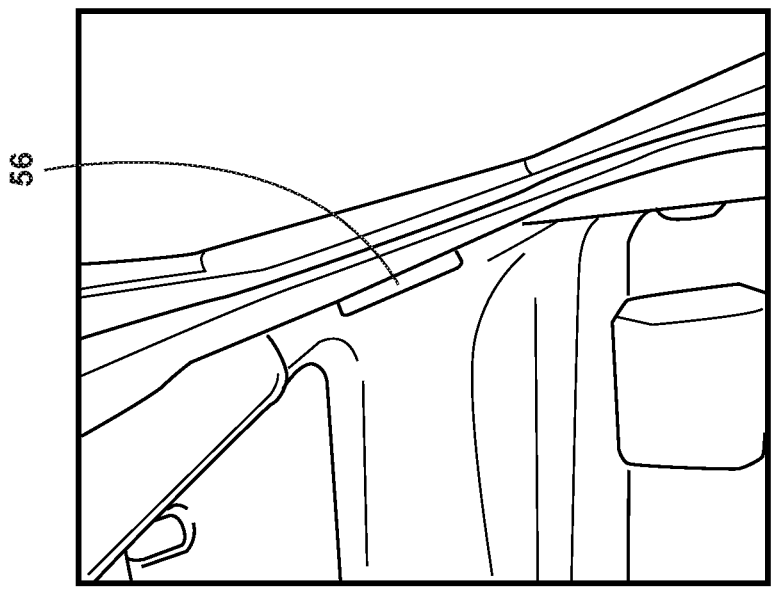
FIG. 3A is an interior perspective view of a vehicle, according to at least one example.
Figure 4:
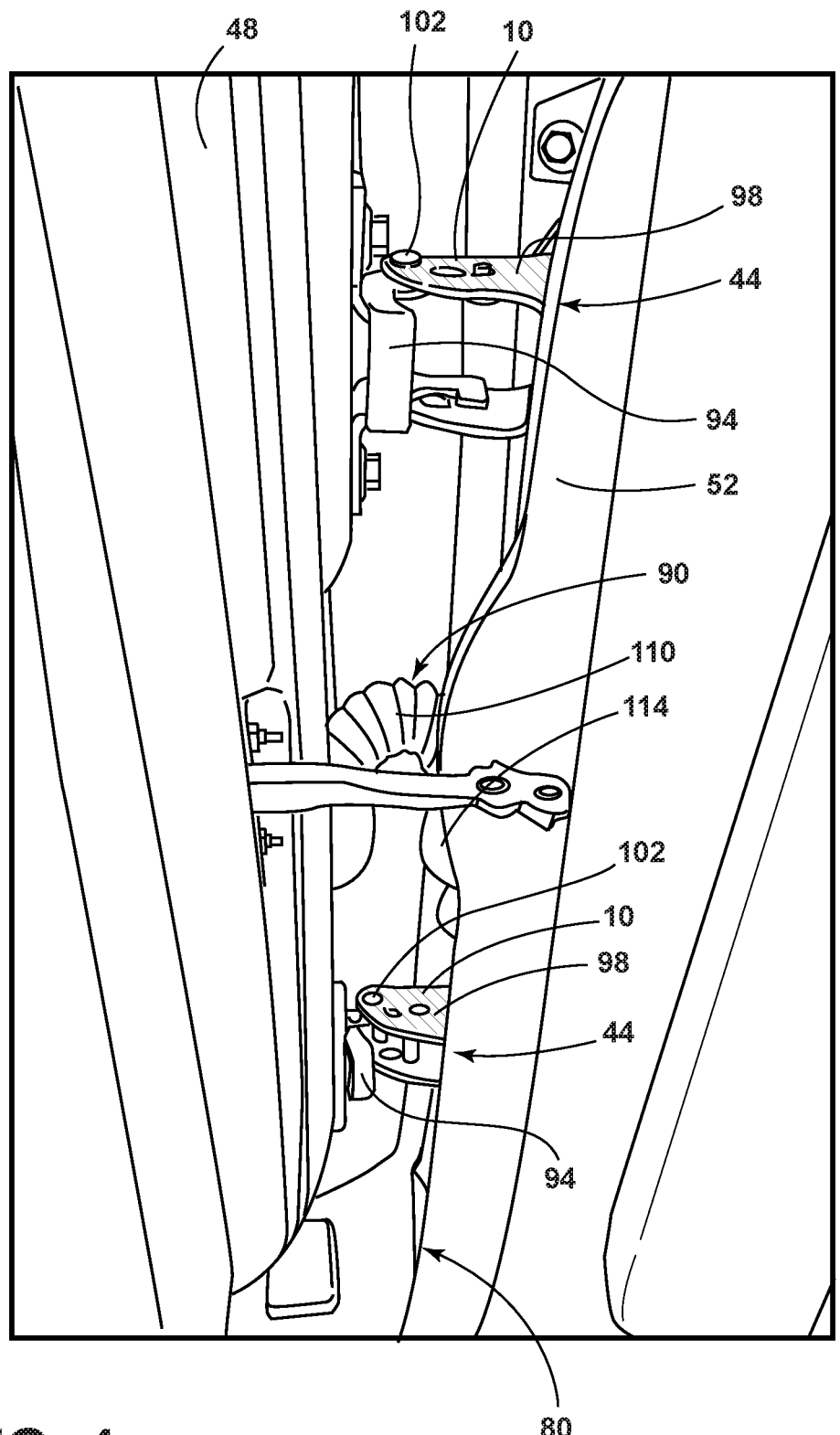
FIG. 4 is an interior perspective view of a vehicle, according to at least one example.

Referring now to FIGS. 3A-4, the plurality doors 48 are connected to a frame 52 proximate a door sill 80. The door sill 80 may extend around door 48 when the doors 48 are in the closed position. The doors 48 are configured to be coupled with the door frame 52 at the sill 80 such that the hinge assemblies 44 are substantially concealed while the doors 48 are in the closed position. It will be understood that in alternative examples of the vehicle 40, one or more of the hinge assemblies 44 may be partially and/or fully visible while the doors 48 are in the closed position. The doors 48 are connected to the frame 52 of the vehicle 40 through one or more hinge assemblies 44 as well as through one or more electrical connections 90. In the depicted example, the doors 48 are connected to the frame 52 through two hinge assemblies 44 (i.e., a first hinge assembly 44 and a second hinge assembly 44) and a single electrical connection 90, but it will be understood that the doors 48 may be coupled to the vehicle 40 through a single hinge assembly 44 or through three or more hinge assemblies 44 per door 48 as well as multiple electrical connections 90.

As explained above, the hinge assemblies 44 allow the doors 48 to rotate between the open and closed positions. In other words, the hinge assemblies 44 rotatably couple each of the vehicle doors 48 to the frame 52. The hinge assemblies 44 are positioned proximate the door sill 80 and are connected to the frame 52. Each of the hinge assemblies 44 may include a door bracket 94, a frame bracket 98 and a hinge pin 102. The door bracket 94 is coupled to the door 48 and extends in an outwardly manner. The frame bracket 98 is coupled to the door sill 80 and extends toward the door bracket 94. Each of the frame bracket 98 and the door bracket 94 may define an aperture through which the hinge pin 102 extends. The hinge pin 102 is configured to couple the frame bracket 98 and door bracket 94 such that the door and frame brackets 94, 98 are pivotally coupled to one another. The hinge pin 102 is capable of being removed from the door and frame brackets 94, 98 to disassemble the hinge assembly 44 such that the doors 48 may be removed from the vehicle 40.

The electrical connection 90 extends between the door 48 and the door sill 80 of the vehicle 40. The electrical connection 90 is configured to supply power and/or electrical signals to and from the door 48 (e.g., to provide electrical energy to power windows and locks). The electrical connection 90 is positioned proximate one or more of the hinge assemblies 44. In the depicted example, the electrical connection 90 extends between a first or upper, hinge assembly 44 and a second, or lower, hinge assembly 44, but it will be understood that the electrical connection 90 may be placed in any location between the door 48 and the door sill 80. The electrical connection 90 includes an electrical passage 110 and a connector 114. The connector 114 may be known as a harness connector 114. The electrical passage 110 may be a flexible tube configured to store electrical wires which extend between the frame 52 and the door 48. The electrical connection 90 may be coupled to the door 48 and/or frame 52 through the connector 114. The connector 114 may removably couple with the frame 52 and/or door 48 to provide a sealed connection for the electrical connection 90. According to at least one example, the connector 114 may be a rubber lid which snaps onto the door sill 80. Although described in connection with the vehicle 40 and the door sill 80, it will be understood that the connector 114 may additionally or alternatively be coupled to the door 48. Use of the electrical connection 90 incorporating the electrical passage 110 and connector 114 may allow for repeatable connection and disconnection of electrical power to the doors 48. Such a feature may be advantageous and decrease the time and effort in transitioning the vehicle 40 between the doors on and doors off configurations. Disconnection of the connector 114 may indicate to a controller of the vehicle 40 that the door 48 has been removed, as will be explained in greater detail below.

The photoluminescent structure 10 may be positioned at a plurality of points which connect the door 48 and the vehicle 40 (e.g., the hinge assemblies 44 and/or the electrical connection 90). For example, the photoluminescent structure 10 may be positioned on one or more of the hinge assemblies 44 and/or on the electrical connection 90. In examples where the photoluminescent structure 10 is positioned on one or more of the hinge assemblies 44, the photoluminescent structure 10 may be positioned on the door bracket 94, the frame bracket 98 and/or the hinge pin 102. For example, the photoluminescent structure 10 is positioned on at least one of the door and the frame bracket 94, 98. Each of the door bracket 94, frame bracket 98 and/or hinge pin 102 may include a separate, discrete, photoluminescent structure 10 or a single photoluminescent structure 10 may extend across one or more of the door bracket 94, frame bracket 98 and/or hinge pin 102. In examples where the hinge assemblies 44 include two or more separate photoluminescent structures 10, each of the photoluminescent structures 10 may be configured to glow or luminesce in a different manner (e.g., in a different color, time of persistence and/or intensity). Further, the one or more photoluminescent structures 10 may be configured as any indicia (e.g., text, symbols, alphanumeric lettering, pictures) which may provide guidance (e.g., explain how to disassemble the hinge assembly 44) to a user of the vehicle 40. In such examples, each of the photoluminescent structures 10 may form a different indicia. It will be understood that the photoluminescent structures 10 positioned on one of the hinge assemblies 44 may be configured to glow or luminesce in a different manner (e.g., in a different color, time of persistence and/or intensity) than photoluminescent structures 10 positioned on other hinge assemblies 44 and/or the electrical connection 90.

Similarly to the hinge assembly 44, the electrical connection 90 may also include the photoluminescent structure 10. For example, the photoluminescent structure 10 may be positioned on the electrical passage 110 and/or the connector 114. As with the hinge assembly 44, a single photoluminescent structure 10 may extend across both the electrical passage 110 and the connector 114, or the connector 114 and electrical passage 110 may have separate photoluminescent structures 10 which may be configured to glow and/or luminesce in a similar or different manner as outlined above. In examples where the electrical connection 90 and/or hinge assemblies 44 include the photoluminescent structure 10, the photoluminescent structure 10 may include one or more protective overmolds. The protective overmolds may be a transparent and/or translucent protective coating configured to reduce the environmental exposure of the photoluminescent structure 10.

The first light assembly 56 is configured to emit light toward the connection between the door 48 and the frame 52 of the vehicle 40. The vehicle 40 may include a plurality of first light assemblies 56. For example, a first light assembly 56 may be positioned proximate each door 48 of the vehicle

40. In some examples, the first light assembly 56 is configured to steer a beam of light to one or more of the hinge assemblies 44 and/or electrical connection 90. Steering of the beam of light from the first light assembly 56 may be advantageous in allowing independent illumination of the hinge assemblies 44 and the electrical connection 90. For example, the light may be emitted toward a single hinge assembly 44 or electrical connection 90 such that the other hinge assemblies 44 and/or electrical connections 90 are not illuminated.

The first light assembly 56 may take a variety of positions both inside and outside of the vehicle 40. For example, the first light assembly 56 may be positioned proximate the door sill 80. In such examples, the first light assembly 56 may be coupled with a headliner and/or associated trim pieces of the vehicle 40. In other words, the first light assembly 56 may be positioned proximate a top of the door sill 80. In yet other examples, the first light assembly 56 may be coupled with an A-pillar and/or B-pillar of the vehicle 40. Examples of the first light assembly 56 positioned on, within or proximate to the headliner of the vehicle 40 may be advantageous in providing a high vantage point with which to emit light towards the hinge assembly 44 and/or electrical connection 90. In addition to illuminating the hinge assemblies 44 and the electrical connection 90, the first light assembly 56 may be configured to provide a map light or general illumination within the vehicle 40 as well as provide a puddle lamp exterior to the vehicle 40.

The first light assembly 56 may include one or a plurality of light-emitting diodes (LEDs), incandescent bulbs, and/or other sources configured to emit light. According to various examples, the first light assembly 56 is configured to emit light having a color corresponding to white, red, blue, green and/or combinations thereof. Additional or alternatively, the first light assembly 56 may be configured to emit the excitation light 24. According to various examples, the first light assembly 56 may emit light configured to illuminate or excite one or more photoluminescent structures 10 present on any component of the hinge assemblies 44 and/or electrical connection 90. Such a feature may be advantageous in helping to illuminate the hinge assemblies 44 and/or electrical connection 90 while transitioning the vehicle 40 between the doors on and doors off configurations. The first light assembly 56 may include one or more sets of optics such that light emitted from the first light assembly 56 may be steered to various locations. As such, the first light assembly 56 may be configured to independently illuminate one or more of the hinge assemblies 44 and/or the connector 114. It will be understood that the first light assembly 56 may be configured to illuminate the hinge assemblies 44 and/or electrical connection 90 in visible light, while independently illuminating one or more of the hinge assemblies 44 and/or electrical connection 90 in the excitation light 24, or vice versa, without departing from the teachings provided herein.

Figure 5:
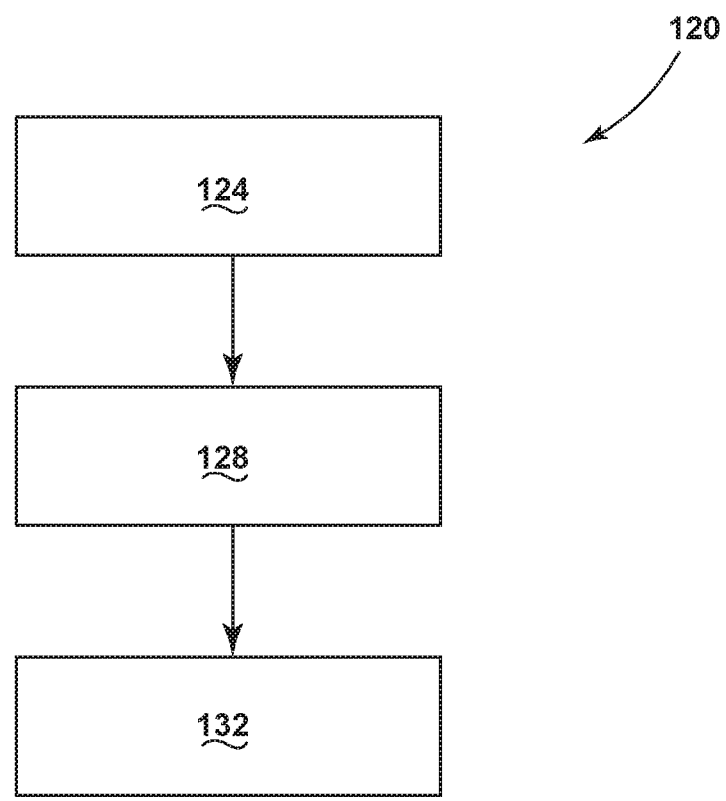
FIG. 5 is a flow diagram, according to at least one example.

Referring now to FIG. 5, a method 120 of removing the door 48 from the vehicle 40 may include a plurality of steps. The method 120 may begin with a step 124 of transitioning the door 48 of the vehicle from the closed position to the open position. Next, a step 128 of activating the first light assembly 56 to emit a beam of light may be performed. Next, a step 132 of steering the beam of light to illuminate the hinge assembly 44 coupling the door 48 and the frame 52 of the vehicle 40 may be performed. As explained above, the step of steering the beam of light to illuminate hinge assembly 44 may be performed by adjusting a lens of the first light assembly 56 and/or by eliminating separate light sources of the first light assembly 56. The method 120 may further include steps of illuminating a plurality of hinge assemblies 44 (e.g., a first hinge assembly 44 and a second hinge assembly 44), illuminating the electrical connector 114, exciting photoluminescent structure 10 on the hinge assembly 44 and/or disassembling the hinge assembly 44. It will be understood that although described in a specific order, the steps of the method 120 may be performed in any order, performed simultaneously, include additional steps and/or omit steps without departing from the teachings provided herein.

Figure 7:
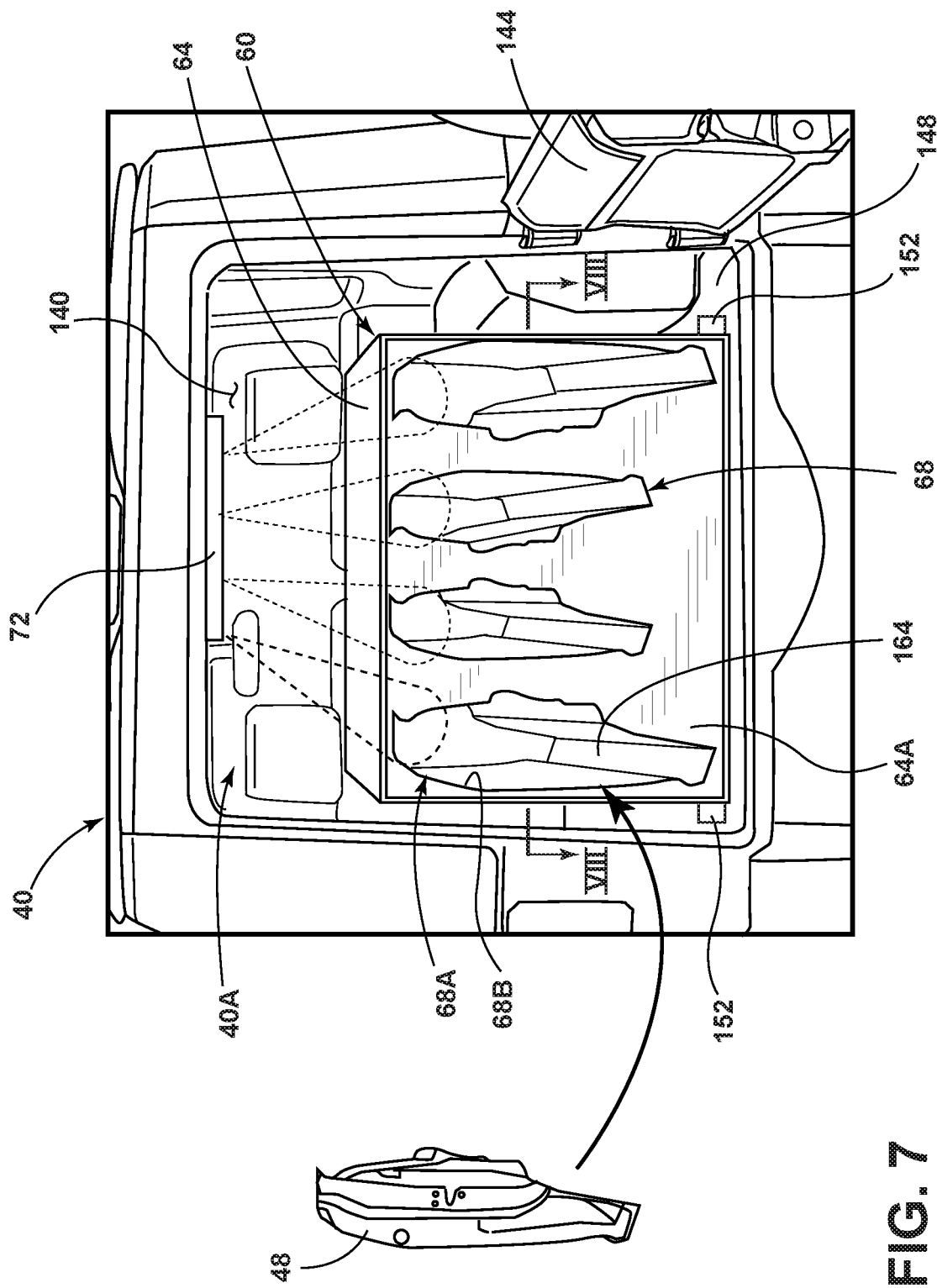
FIG. 7 is a rear elevational view of a vehicle incorporating a door retention system, according to at least one example.
Figure 8:
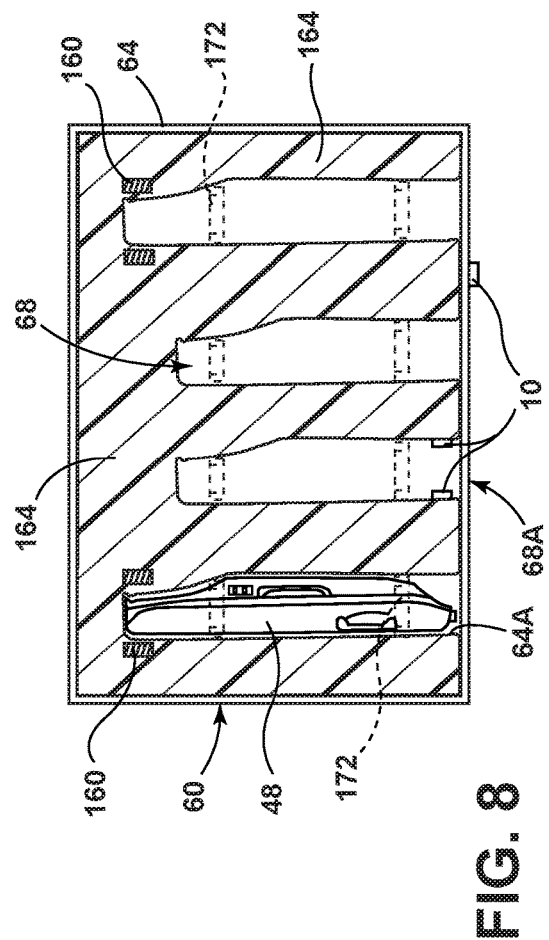
FIG. 8 is a cross-sectional view taken along line VIII-VIII of FIG. 7, according to at least one example.
Figure 9:
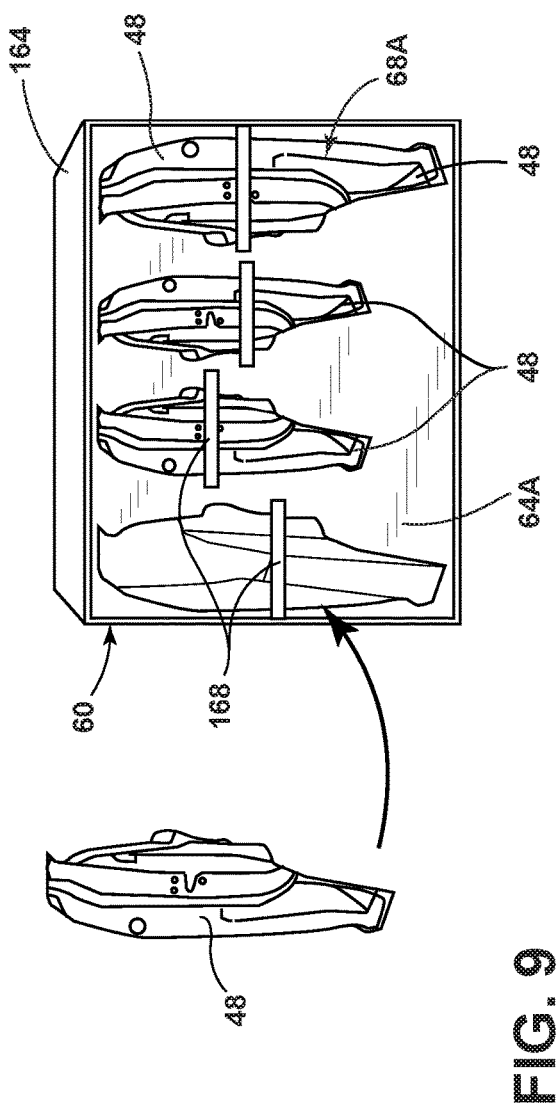
FIG. 9 is a rear elevational view of the door retention system, according to at least one example.

Referring now to FIGS. 6 and 7, in the doors off configuration, the doors 48 may be stored within the door retention system 60 which is positioned in a cargo area 140 of the vehicle 40. The cargo area 140 may be positioned toward a rear of the interior cabin 40A of the vehicle 40. The cargo area 140 may be accessed through a rear door 144. The rear door 144 is operable between open and closed positions. In the open position, the rear door 144 allows the vehicle doors 48 to be moved into and out of the cargo area 140 such that the doors 48 may be placed inside the door retention system 60. The cargo area 140 may include a cargo floor 148 on which the door retention system 60 is positioned. It will be understood that the door retention system 60 may additionally or alternatively be coupled to walls and/or a ceiling of the cargo area 140 as well as seating assemblies of the vehicle 40 without departing from the teachings provided herein. The door retention system 60 may be coupled to the cargo floor 148 via one or more attachment features 152 provided by the cargo floor 148. It will be understood that a housing 64 of the door retention system 60 may include one or more retention features configured to couple with the attachment features 152 provided by the cargo floor 148. Further, the door retention system 60 may be secured within the cargo area 140 via one or more straps which couple with the attachment features 152 and hold the housing 64 in place (e.g., straps and/or lashings placed over a top of the housing 64). The attachment features 152 may otherwise be known as cargo tie downs. The attachment features 152 may be integrally defined by the cargo floor 148 or may be coupled thereto in a variety of fashions. Further, the attachment features 152 may be coupled to walls or a ceiling of the cargo area 140 and/or as seating assemblies of the vehicle 40 without departing from the teachings provided herein.

Referring now to FIGS. 6-9, the door retention system 60 includes the housing 64, slots 68 defined by the housing 64, a sensor 160, the second light assembly 72, a cushion 164, one or more retention straps 168, one or more rollers 172 and may optionally include the photoluminescent structure 10.

As explained above, the housing 64 is positioned within the cargo area 140 of the vehicle 40. The housing 64 may alternatively be known as, or referred to as, a locker. For example, the housing 64 may function as a locker for storing the vehicle doors 48. The housing 64 may be composed of a metal, a polymeric material and/or combinations thereof. It will be understood that different substrates of the housing 64 may be composed of different materials. According to various examples, the housing 64 may be a box-like structure. The housing 64 may be composed of a plurality of substrates positioned around the housing 64. The housing 64 includes a slot substrate 64A. The slot substrate 64A may be positioned on a vehicle rearward side of the housing 64 such that the slot substrate 64A is accessible when the rear door 144 is in the open position. The substrate may be a solid structure (e.g., a plate), a mesh or combinations thereof. For example, portions of the substrate may be mesh while other portions may be solid. The housing 64 may include a top substrate or the housing 64 may remain open on top (e.g., such that the doors 48 are visible within the housing 64). As will be explained in greater detail below, the housing 64 is configured to hold, or stow, the doors 48 inside. It will be understood that the housing 64 may take a variety of configurations without departing from the teachings provided herein. As will be explained in greater detail below, the housing 64 defines one or more slots 68 which are configured to accept the vehicle doors 48. Insertion of the vehicle doors 48 into the slots 68 allows the housing 64 to retain, stow or otherwise hold the vehicle doors 48. The doors 48 may be inserted into the housing 64 through openings 68A defined by the slot substrate 64A.

The slots 68 of the door retention system 60 are defined through the slot substrate 64A and into the housing 64. The slots 68 begin at the opening 68A in the slot substrate 64A and extend into the housing 64. It will be understood that the housing 64 may not include the slot substrate 64A, but instead, the housing 64 may be filled with a foam which defines the slots 68, as will be explained in greater detail below. The slots 68 include an interior surface 68B. The housing 64 may define a single slot 68 or the housing 64 may define a plurality of slots 68. Each of the slots 68 is configured to accept a vehicle door 48. In other words, each of the slots 68 is configured to accept the insertion of a vehicle door 48 into the housing 64. The slots 68 are shaped similarly to the doors 48. For example, the slots 68 may have a cross-sectional shape which is substantially similar to that of the doors 48. In other words, an outline of a perimeter of the slots 68 may be similar to that of the door 48 such that the slot 68 defines complementary features to the door 48. Described in yet another way, the slot 68 may have a shape substantially similar to a silhouette or outside perimeter of the doors 48. As each of the doors 48 of the vehicle 40 has a different shape (e.g., driver front door vs. passenger rear door) and orientation (e.g., driver side or passenger side), each of the slots 68 may have a different cross-sectional shape. In other words, the perimeter of each of the slots 68 may have a different shape. As such, each slot 68 may be designed for a specific door 48. It will be understood that in examples where each of the doors 48 of the vehicle 40 is identical, the slots 68 may likewise be identical (e.g., except for driver vs. passenger side orientation). The conforming shape of the slots 68 to the doors 48 may be advantageous in reducing a rattle of the doors 48 within the housing 64. Further, the conforming shape may be advantageous in reducing the likelihood of door misplacement (e.g., as each door 48 should only fit one slot 68) as well as in reducing damage to the doors 48.

The slots 68 extend in a vehicle forward direction from the slot substrate 64A. The slots 68 have a depth, as measured from the slot substrate 64A, which is sufficient to allow insertion of the doors 48 into the housing 64. For example, the depth of the slots 68 may be such that a portion, a majority, substantially all or all of the doors 48 may be inserted into each slot 68. In other words, the doors 48 may fit fully within the slots 68. According to various examples, the slots 68 are deep enough, or extend in a vehicle forward direction far enough, that the doors 48 may be fully inserted into the housing 64. The positioning and orientation of the slots 68 within the housing 64 allows the doors 48 to be stored in an upright, or vertical, fashion while facing in a vehicle-forward-to-vehicle-rearward direction. It will be understood that in alternative examples of the housing 64 and slots 68, the doors 48 may be stored in a horizontal orientation and that the doors 48 may extend in a driver-side to passenger-side direction while stowed. Further, it will be understood that one or more light sources may be positioned within one or more of the slots 68 to illuminate the slots 68.

The photoluminescent structure 10 may be positioned in one, a plurality or all of the slots 68. The photoluminescent structure 10 may extend over a portion, majority or substantially all of the interior surface 68B. The photoluminescent structure 10 may be illuminated by the second light assembly 72 as explained in greater detail below. The photoluminescent structure 10 may form one or more indicia within the slots 68 and/or proximate the openings 68A on the slot substrate 64A. The indicia formed from the photoluminescent structures 10 may include text, symbols, alphanumeric lettering and/or pictures. In examples of the photoluminescent structure 10 positioned within the slots 68, the photoluminescent structure 10 may be configured to emit light out of the openings 68A such that it is visible to a user of the door retention system 60.

The cushion 164 may be positioned in one, a plurality or all of the slots 68. The cushion 164 may extend over a portion, a majority or substantially all of the interior surface 68B. As such, the cushion 164 may define the interior surface 68B of the slots 68. The cushion 164 may be composed of a soft and/or compressible material. For example, the material of the cushion 164 may include a foam (e.g., a soft foam, a hard foam, a compressible foam, etc.), a fabric and/or other soft and/or compressible materials. In hard foam examples of the cushion 164, the foam may be composed of expanded polypropylene. In operation, the cushion 164 is configured to prevent damage from occurring to the doors 48. For example, while the vehicle 40 is motion, the door 48 may come in contact with the interior surface 68B of the slots 68. Without the cushion 164, the doors 48 may be subject to scratching and/or marring which may produce non-aesthetically pleasing damage on the doors 48. Further, the cushion 164 may be configured to deaden noise related to movement of the doors 48 within the housing 64. In other words, use of the cushion 164 may decrease rattling of the door 48 within the housing 64.

The retention straps 168 are positioned across the openings 68A defined in the slot substrate 64A. The retention straps 168 may be composed of a polymeric material, a metal, a natural material, a rubber, an elastomeric material, a fabric and/or combinations thereof. The retention straps 168 are coupled to the housing 64 and extend across the openings 68A. The retention straps 168 may include an attachment feature which couples to the slot substrate 64A in a variety of manners. For example, the attachment feature of the retention strap 168 may include a hook and an eyelet on the slot substrate 64A, Velcro®, magnets, other attachment mechanisms and/or combinations thereof. Additionally or alternatively, the retention strap 168 may be a hard, solid structure which pushes the doors 48 into the slots 68 and against the cushion 164 to secure the doors 48 against rattling. It will be understood that the retention straps 168 may be coupled to the slot substrate 64A using the attachment feature on one or two sides of the slots 68. Further, a single or a plurality of retention straps 168 may extend across a plurality or all of the slots 68 without departing from the teachings provided herein. Use of the retention straps 168 may be advantageous in retaining the doors 48 within the slots 68. For example, the retention straps 168 prevent the doors 48 from migrating out of the slots 68 and potentially falling from the vehicle 40. Further, in elastomeric examples of the retention straps 168, the retention straps 168 may serve to provide a biasing effect which pushes the doors 48 in a vehicle forward direction into the slots 68 and toward the sensor 160. Such a biasing effect may be known as a compression fit within the slots 68. Such biasing toward the sensor 160 may increase the likelihood of the sensor 160 detecting the presence of the doors 48.

The sensors 160 may be positioned within and/or proximate the slots 68 and are configured to detect the presence of the doors 48. Each slot 68 may have a corresponding sensor 160, each slot 68 may have multiple sensors 160, a single sensor 160 may be configured to detect doors 48 in separate slots 68, or combinations thereof. In the depicted example, the sensors 160 are positioned proximate a vehicle forward portion of the slots 68, but it will be understood that the sensors 160 may be positioned in a variety of locations proximate the slots 68. According to at least one example, the sensors 160 are positioned proximate an end of the slot 68. Additionally or alternatively, the sensors 160 may be positioned vehicle forward of the openings 68A. Further, it will be understood that the positioning of the sensors 160 may vary across the slots 68. In other words, each sensor 160 may be positioned in a different spot relative to its corresponding slot 68. The sensors 160 may take a variety of configurations which may detect the presence and/or absence of the doors 48. For example, the sensors 160 may include capacitive sensors, proximity sensors, magnetic sensors, electromagnetic sensors and/or combinations thereof. Further, will be understood that each of the sensors 160 may include a plurality of sensors each configured to detect a different aspect of the doors 48. According to a specific example, the sensors 160 are capacitive sensors and are configured to detect the presence of the doors 48. The sensors 160 may be electrically coupled with the vehicle 40 (e.g., to a LIN bus) and configured to alert the vehicle 40 to the presence of the doors 48 within the housing 64.

One or more rollers 172 may be positioned at a bottom of the slots 68. For example, a single roller 172, two rollers 172, or greater than two rollers 172 may be positioned along the bottom of the slots 68. In a specific example, a plurality of rollers 172 is positioned at the bottom of slots 68. It will be understood that the quantity and placement of rollers 172 in the slots 68 may vary from slots 68 to slot 68. Additionally or alternatively, one or more rollers 172 may be positioned along sides of the slot 68. The rollers 172 are configured to roll when in contact with the doors 48. As such, the rollers 172 may aid in sliding the doors 48 into and out of the slots 68.

The second light assembly 72 is positioned within the interior 40A of the vehicle 40. In the depicted example, the second light assembly 72 is positioned within the cargo area 140. The second light assembly 72 may be positioned proximate a sill on the rear door 144, on a headliner and/or a side wall of the cargo area 140. In other words, the second light assembly 72 may be positioned away from the housing 64. The second light assembly 72 may include one or a plurality of light-emitting diodes (LEDs), incandescent bulbs, and/or other sources configured to emit light. According to various examples, the second light assembly 72 is configured to emit light having a color corresponding to white, red, blue, green and/or combinations thereof. Additionally or alternatively, the second light assembly 72 may be configured to emit the excitation light 24. In such examples, the slots 68 and/or housing 64 may include the photoluminescent structure 10. The second light assembly 72 may include one or more sets of optics such that light emitted from the second light assembly 72 may be steered to various locations within the cargo area 140 and/or the door retention system 60. According to various examples, the second light assembly 72 may be configured to illuminate one or more of the slots 68. As will be explained in greater detail below, the second light assembly 72 may illuminate a specific slot 68 based on a detection of which door 48 has been removed from the vehicle 40. For example, the second light assembly 72 may illuminate a desired slot 68 in a first color (e.g., green) and the other slots 68 in a second color (e.g., red). In examples where the photoluminescent structure 10 is positioned within one or more of the slots 68 and the second light assembly 72 is configured to emit the excitation light 24, the second light assembly 72 may direct the excitation light 24 to the photoluminescent structure 10 such that an appropriate slot 68 for a vehicle door 48 is illuminated for a user. Further, the excitation light 24 may be configured to cause the photoluminescent structure 10 to illuminate in the colors listed above under the above-noted conditions. It will be understood that the second light assembly 72 may additionally or alternatively function as a dome light for the cargo area 140.

Figure 10:
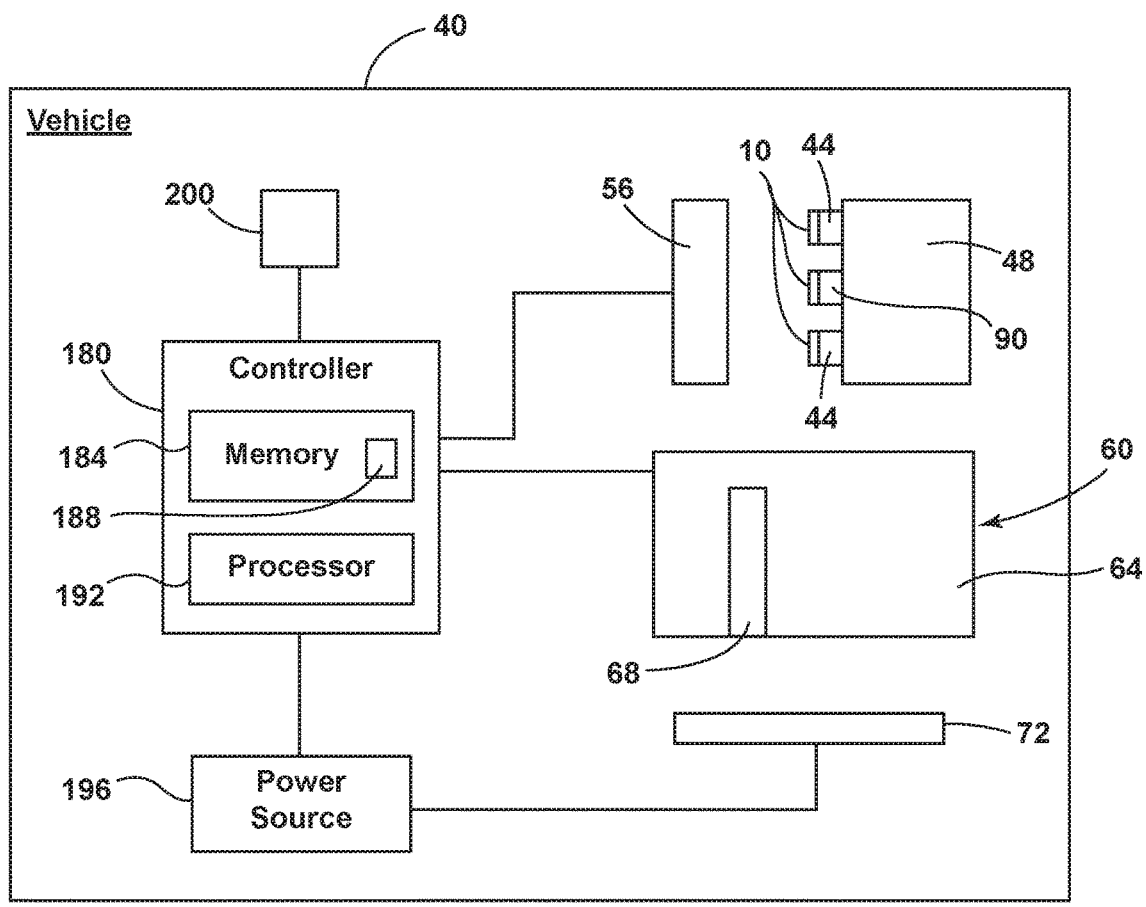
FIG. 10 is a block diagram of the vehicle, according to at least one example.

Referring now to FIG. 10, depicted is a block diagram of the vehicle 40. The vehicle 40 includes a controller 180 which includes a memory 184 having a light control routine 188 contained therein that is executed by a processor 192 of the controller 180. The controller 180 may provide electrical power to the first and second light sources 56, 72 via a power source 196 located onboard the vehicle 40. The controller 180 may be coupled with a user interface 200. The user interface 200 may be a human machine interface, a display, a touch screen, a switch, a button, a microphone for receiving voice commands, other interfaces and/or combinations thereof. The user interface 200 may be configured to activate the controller 180 to implement the light control routine 188. In display examples of the user interface 200, the interface 200 may display door removal information (e.g., text, pictures, symbols, video) in tandem with the illumination of the hinge assemblies 44.

Figure 11:
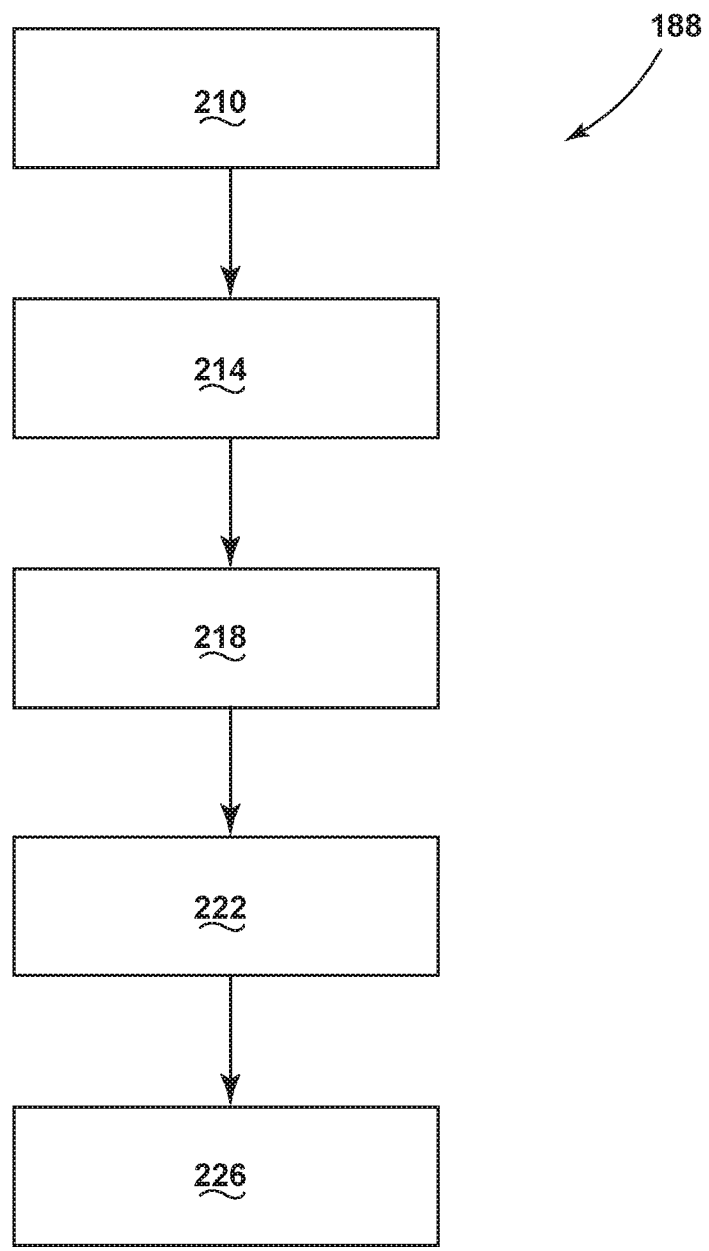
FIG. 11 is an exemplary flow diagram, according to at least one example.

Referring now to FIGS. 10 and 11, the light control routine 188 may be configured to control a variety of lighting sequences performed by the first and second light assemblies 56, 72. For example, the light control routine 188 may indicate to a user of the vehicle 40 how to remove the doors 48 from the vehicle 40 and store the doors 48 within the door retention system 60. Additionally or alternatively, the light control routine 188 may indicate to a user of the vehicle 40 how to reinstall the doors 48 of the vehicle 40 after removal from the door retention system 60.

Referring now to FIG. 11, an exemplary method of operating the light control routine 188 may begin with a step 210 of indicating to a user of the vehicle 40 how to remove the doors 48. For example, the light control routine 188 may illuminate the hinge assemblies 44 and/or electrical connection 90 in a predefined pattern to indicate to the user how each door 48 should be removed. For example, after the user has indicated they wish to transition the vehicle 40 from the doors on to the doors off configuration through the user interface 200, the first light source 56 may independently illuminate the hinge assemblies 44 and electrical connection 90 of a specified door 48. In examples utilizing the photoluminescent structures 10, the first light source 56 may excite the photoluminescent structures 10 with the excitation light 24. For example, the first light source 56 may illuminate the hinge pin 102 of one of the hinge assemblies 44 of the driver-front door 48 indicating to the user that that hinge pin 102 should be removed. In other examples, all of the hinge assemblies 44 and/or electrical connection 90 may be illuminated such that all of the connection points are illuminated in a first color (e.g. red) and a specific connection point (e.g., one of the hinge assemblies 44) is illuminated and a second color (e.g., green) to indicate which connection points the user should disassemble first. The first light source 56 may illuminate the hinge assembly 44 in a first color and the hinge pin 102 may be excited to indicate it should be removed. Once a predetermined amount of time has elapsed, or the vehicle 40 detects that the target hinge assembly 44 is disassembled, the light control routine 188 may instruct the first light source 56 to steer or adjust the beam of light to another hinge assembly 44 and/or the electrical connection 90. According to various examples, the vehicle 40 may include a sensor coupled with, or proximate to, the hinge assemblies 44 to detect whether or not each of the target hinge assemblies 44 has been disassembled. Once the target hinge assembly 44 has been disassembled, the light control routine 188 may instruct the first light assembly 56 to steer light to other hinge assemblies 44 and/or electrical connection 90 on the same door 48. Once all of the connections (e.g., the hinge assemblies 44 and the electrical connection 90) between the door 48 and the frame 52 are removed from the vehicle 40, a user may carry the doors 48 to the rear of the vehicle 40.

Next a step 214 of illuminateing the slot 68 of the door retention system 60 corresponding to the door 48 that the user has removed from the vehicle 40 may be performed. As explained above, a sensor (e.g., proximate the hinges) may detect which of the doors 48 has been removed and communicate this information to a controller or LIN bus on the vehicle 40. In response, the controller or LIN bus may cause the second light assembly 72 to illuminate the corresponding slot 68. For example, when the front driver-side door 48 is removed, the slot 68 which is shaped like the front driver-side door 48 is illuminated. Such a feature may be advantageous to quickly alert the user to the proper slot 68 in which the door 60 should be inserted.

Next a step 218 of aligning the door 48 with the slot 68 and inserting the door 48 into the housing 64 may be performed. Insertion of the door 48 in the slot 68 is aided by the rollers 172 which allow rolling of the door 48 into the housing 64. It will be understood that alternatively the rollers 172 may be omitted and the door 48 may simply be slid along the bottom of the slot 68. The door 48 may be slid into the housing 64 until a portion, a majority, substantially all or all of the door 48 is inside of the housing 64. Once the door 48 reaches a predetermined depth within the slot 68, the sensor 160 detects the presence of the door 48 and sends a signal to the controller or LIN bus on the vehicle 40.

Next, a step 222 of detection of the door 48 by the sensor 160 may alter the lighting or illumination provided to the slot 68 by the second light assembly 72. For example, detection that the door 48 is at the prescribed depth within the slot 68 may change the color, intensity, intermittence or other characteristic of the light emitted. Further, it will be understood that additionally or alternatively the photoluminescent structure 10 may be excited or activated in a different manner to indicate that the door 48 is at the prescribed depth within the slot 68.

Next, a step 226 of placing the retention strap 168 across the opening 68A of the slot 68 to retain the door 48 within the housing 64 is performed. As explained above, the retention strap 168 may be composed of an elastomeric or stretchable material which may provide resiliency and hold the door 48 firmly against the cushion 164 such that the rattling of the door 48 within the housing 64 is minimized.

Once the door 48 is secure within the housing 64, the light control routine 188 may be repeated for each of the other doors 48 located on the vehicle 40. According to various examples, the light control routine 188 may be executed in a predetermined order. For example, the light control routine 188 may be executed to remove the driver-front door 48, the driver-rear door 48, passenger-rear door 48 and passenger-front door 48 in order. Such a feature may be advantageous in reducing the chance of misplaced or improperly secured doors 48. Further, the light control routine 188 may be executed in essentially a reverse order to aid the user in reassembling the doors 48 in the correct position.

Use of the present disclosure may offer a variety of advantages. First, use of the presently disclosed vehicle 40 may allow illumination of multiple hinge assemblies 44 as well as the electrical connection 90 from a single light assembly. Second, the first light assembly 56 is able to independently, or separately, vary the illumination on the hinge assemblies 44 and/or electrical connector 90. Third, the first light assembly 56 may be configured to provide a map light or general illumination within the vehicle 40 as well as provide a puddle lamp exterior to the vehicle 40. Further, in certain placements of the first light assembly 56 (e.g., high door sill 80 locations), the light assembly may illuminate in a vehicle rearward direction both inside and outside the vehicle 40. Fourth, the first light assembly 56 is configured to emit both an excitation light 24 (e.g., blue or ultraviolet light) to activate the photoluminescent structures 10 on the hinge assemblies 44 and electrical connection 90, as well as white and colored light to generally illuminate the hinge assemblies 44 and electrical connection 90. Fifth, excitation of the photoluminescent structures 10 on the hinge pins 102 by the first light assembly 56 may allow the hinge pins 102 to stand out regardless of day or night around the vehicle 40. Sixth, the connector 114 may be a tethered connector such that the electrical connection 90 may be decoupled or disconnected from the door sill 80 of the vehicle 40. Seventh, the disclosed door retention system 60 allows for the doors 48 to be stored within the vehicle 40. Eighth, use of the cushion 164 resists damage from occurring to the doors 48 and resists rattling of the doors 48 within the housing 64. Ninth, use of the door-shaped slots 68 allows the quick and easy determination of which door 48 should be placed in which slot 68. Tenth, use of the second light assembly 72 further eases the user's determination of where to place the door 48. Eleventh, use of the retention straps 168 decreases the chances of the doors 48 migrating out of the housing 64 and becoming damaged. Twelfth, the first and second light assemblies 56, 72 may activate puddle lamps during transitioning of the vehicle 40 between the doors on and doors off configurations.

According to various embodiments, a vehicle includes a hinge assembly rotatably coupling a vehicle door to a frame of the vehicle, a first light assembly positioned proximate the door and configured to illuminate the hinge assembly, a door retention system having a housing defining a slot configured to accept the insertion of the vehicle door and a second light assembly configured to illuminate the slot. Embodiments of the vehicle can include any one or a combination of the following features:

a cushion positioned within the slot;
    a cargo area positioned within an interior of the vehicle, wherein the door retention system is positioned within the cargo slot;
    a roller and a cushion positioned within the slot and configured to engage the door;
    a sensor positioned within the slot and configured to detect the presence of the door within the housing;
    an electrical connection positioned proximate the hinge assembly;
    the first light assembly coupled with a headliner of a vehicle;

a luminescent structure positioned on a connector of the electrical connection;
the light assembly configured to independently illuminate the hinge assembly and an electrical connection;
a luminescent structure positioned on the hinge assembly; and/or
the luminescent structure positioned on a hinge pin of the hinge assembly.

According to various embodiments, a method of removing and storing a door of a vehicle includes steps of activating a first light assembly to illuminate a hinge assembly coupling the door to the vehicle; disassembling the hinge assembly; activating a second light assembly to illuminate a slot of a door retention system; and inserting the door into the slot. Embodiments of the method can include any one or a combination of the following features and steps:

activating the first light assembly to illuminate an electrical connection extending between the door and the frame;
activating the first light assembly to excite a photoluminescent structure positioned on the hinge assembly; and/or
activating the first light assembly to excite a photoluminescent structure positioned on the electrical connection.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A vehicle, comprising:
a hinge assembly rotatably coupling a vehicle door to a frame of the vehicle;
a first light assembly positioned proximate the door and configured to illuminate the hinge assembly, wherein the first light assembly is configured to independently illuminate the hinge assembly and an electrical connection;
a door retention system having a housing defining a slot configured to accept an insertion of the vehicle door; and
a second light assembly configured to illuminate the slot.

2. The vehicle of claim 1, further comprising:
a cushion positioned within the slot.

3. The vehicle of claim 1, further comprising:
a cargo area positioned within an interior of the vehicle, wherein the door retention system is positioned within the cargo area.

4. The vehicle of claim 1, further comprising:
a roller and a cushion positioned within the slot, wherein the roller and the cushion are configured to engage the door.

5. The vehicle of claim 1, further comprising:
a sensor positioned within the slot and configured to detect the presence of the door within the housing.

6. The vehicle of claim 1, wherein the electrical connection is positioned proximate the hinge assembly.

7. The vehicle of claim 1, wherein the first light assembly is coupled with a headliner of the vehicle.

8. The vehicle of claim 1, further comprising:
a luminescent structure positioned on a connector of the electrical connection.

9. The vehicle of claim 1, further comprising:
a luminescent structure positioned on the hinge assembly.

10. The vehicle of claim 9, wherein the luminescent structure is positioned on a hinge pin of the hinge assembly.

11. A vehicle, comprising:
a hinge assembly rotatably coupling a vehicle door to a frame of the vehicle;
a first photoluminescent structure positioned on the hinge assembly;
a door retention system having a housing defining a slot configured to accept an insertion of the vehicle door; and
a light assembly configured to illuminate the slot.

12. The vehicle of claim 11, further comprising:
a sensor positioned within the slot and configured to detect the presence of the door within the housing.

13. The vehicle of claim 11, further comprising:
a roller positioned at a bottom of the slot.

14. The vehicle of claim 11, wherein the housing defines a plurality of slots, each of the slots having a cross-sectional shape substantially similar to that of a different vehicle door.

15. The vehicle of claim 11, further comprising:
a retention strap coupled to the housing and extending across the slot.

16. A method of removing and storing a door of a vehicle, comprising the steps of:
activating a first light assembly to illuminate a hinge assembly coupling the door to the vehicle;
activating the first light assembly to excite a photoluminescent structure positioned on the hinge assembly;
disassembling the hinge assembly;
activating a second light assembly to illuminate a slot of a door retention system; and
inserting the door into the slot.

17. The method of claim 16, further comprising the step of:
activating the first light assembly to illuminate an electrical connection extending between the door and the frame.

18. The method of claim 16, further comprising the step of:
activating the first light assembly to excite a photoluminescent structure positioned on the electrical connection.

\* \* \* \* \*